US011368357B2

(12) United States Patent
Li et al.

(10) Patent No.: US 11,368,357 B2
(45) Date of Patent: *Jun. 21, 2022

(54) SERVICE FAULT LOCATING METHOD AND APPARATUS

(71) Applicant: Huawei Technologies Co., Ltd., Shenzhen (CN)

(72) Inventors: Congjuan Li, Nanjing (CN); Feng Li, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 45 days.

This patent is subject to a terminal disclaimer.

(21) Appl. No.: 17/009,334

(22) Filed: Sep. 1, 2020

(65) Prior Publication Data

US 2020/0403849 A1 Dec. 24, 2020

Related U.S. Application Data

(63) Continuation of application No. 15/856,935, filed on Dec. 28, 2017, now Pat. No. 10,785,095, which is a
(Continued)

(30) Foreign Application Priority Data

Jun. 29, 2015 (CN) .......................... 201510372320.4

(51) Int. Cl.
*H04L 41/0677* (2022.01)
*H04L 41/12* (2022.01)
(Continued)

(52) U.S. Cl.
CPC .......... *H04L 41/0677* (2013.01); *H04L 41/00* (2013.01); *H04L 41/12* (2013.01); *H04L 69/324* (2013.01)

(58) Field of Classification Search
CPC .... H04L 41/0677; H04L 41/12; H04L 69/324
See application file for complete search history.

(56) References Cited

U.S. PATENT DOCUMENTS 6,700,873 B1 3/2004 Sugaya et al.
6,766,482 B1 7/2004 Yip et al.
(Continued)

FOREIGN PATENT DOCUMENTS

CN 1848757 A 10/2006
CN 101155076 A 4/2008
(Continued)

OTHER PUBLICATIONS

Senevirathne et al., "Generic Yang Data Model for Operations, Administration, and Maintenance (OAM) draft-tissa-lime-yang-oam-model-05," Network Working Group, Internet-Draft, Intended status: Standards Track, pp. 1-46, IETF Trust, Reston, Virginia (Jun. 1, 2015).
(Continued)

*Primary Examiner* — Brian P Cox
(74) *Attorney, Agent, or Firm* — Leydig, Voit & Mayer, Ltd.

(57) ABSTRACT

A service fault locating method and apparatus for precisely locating a network fault problem in a multi-layer OAM architecture network. The method includes: receiving a service fault locating request message; determining, an $IP_S$, and an $IP_D$, that a service fault is between a first layer-3 device and a second layer-3 device; obtaining a first network topology between the first layer-3 device and the second layer-3 device; determining a first forwarding path of the service packet between the first layer-3 device and the second layer-3 device according to the first network topology; configuring a forwarding entry of a forwarding device in the first forwarding path, and triggering the first layer-3 device to generate an extended layer-2 OAM packet; and
(Continued)

obtaining a first path parameter of the first forwarding path, and determining a specific location of the service fault according to the first path parameter.

18 Claims, 8 Drawing Sheets

Related U.S. Application Data continuation of application No. PCT/CN2016/086379, filed on Jun. 20, 2016.

(51) Int. Cl.
*H04L 41/00* (2022.01)
*H04L 69/324* (2022.01)

(56) References Cited

U.S. PATENT DOCUMENTS

| | | | |
|---|---|---|---|
| 2009/0185495 | A1 | 7/2009 | Zi |
| 2011/0219111 | A1 | 9/2011 | Shevenell |
| 2012/0020232 | A1* | 1/2012 | Yoshioka ............... H04L 43/10 370/252 |
| 2012/0099443 | A1* | 4/2012 | Makishima ............. H04L 43/10 370/248 |
| 2014/0078884 | A1 | 3/2014 | Shukla et al. |
| 2014/0348006 | A1 | 11/2014 | Jain et al. |
| 2014/0362682 | A1 | 12/2014 | Guichard et al. |
| 2015/0189409 | A1* | 7/2015 | He ....................... H04L 45/121 398/26 |
| 2016/0352633 | A1 | 12/2016 | Kapadia et al. |
| 2017/0111209 | A1* | 4/2017 | Ward ................. H04L 12/4633 |

FOREIGN PATENT DOCUMENTS

| | | |
|---|---|---|
| CN | 101557343 A | 10/2009 |
| CN | 101986604 A | 3/2011 |
| CN | 102984011 A | 3/2013 |
| CN | 103428009 A | 12/2013 |
| CN | 103716172 A | 4/2014 |
| EP | 2903208 A1 | 8/2015 |
| WO | 2011024187 A2 | 3/2011 |

OTHER PUBLICATIONS

Jain et al., "Generic Overlay OAM and Datapath Failure Detection drafl-jain-nvo3-overlay-oam-01," NVO3, Internet-Draft, Intended status: Standards Track, pp. 1-44, Internet Engineering Task Force, Reston, Virginia (Feb. 12, 2014).

* cited by examiner

| 8 | 7 | 6 | 5 | 4 | 3 | 2 | 1 |
|---|---|---|---|---|---|---|---|
| Hwonly | Reserved | | | | | | |

FIG. 6

SERVICE FAULT LOCATING METHOD AND APPARATUS

CROSS-REFERENCE TO RELATED APPLICATIONS

This application is a continuation of U.S. patent application Ser. No. 15/856,935, filed on Dec. 28, 2017, which is a continuation of International Application No. PCT/CN2016/086379, filed on Jun. 20, 2016, which claims priority to Chinese Patent Application No. 201510372320.4, filed on Jun. 29, 2015. All of the aforementioned patent applications are hereby incorporated by reference in their entireties.

TECHNICAL FIELD

Embodiments of the present invention relate to the communications field, and in particular, to a service fault locating method and apparatus.

BACKGROUND

According to an actual requirement for operating a network by an operator, network management work is generally classified into three categories: operation, administration, and maintenance, that is, OAM for short. In an existing OAM technology, many network technologies and network layers have respective OAM mechanisms and protocol tools for a same OAM function. For example, both for a continuity check (CC) function, an Internet Protocol (IP) layer has Internet Control Message Protocol (ICMP) ping, and a Multiprotocol Label Switching (MPLS) technology has label switched path (LSP) ping.

In an existing multi-layer OAM architecture network, an OAM packet at each layer has a specific encapsulation header/encapsulation value. OAM packets having different encapsulation headers/encapsulation values may be transmitted in a network along different forwarding paths, that is, OAM packets at different layers may have different forwarding paths. When a network fault is being located, to find a fault cause, different OAM packets generally need to be sent at multiple protocol layers, and an OAM packet at each protocol layer needs to have a same forwarding path as that of a service packet. However, an existing multi-layer OAM architecture does not have a service fault locating capability that ensures consistent forwarding paths of OAM packets at various protocol layers.

To resolve the foregoing problem, a network virtualization over layer 3 (NVO3) working group in the Internet Engineering Task Force (IETF) proposes an OAM solution applied to a virtual extensible local area network (VxLAN). In this solution, a VxLAN OAM packet and a service packet use a same encapsulation form to ensure that the VxLAN OAM packet and the service packet have a same forwarding path. A time to live (TTL) field at an IP layer is used in the VxLAN OAM packet to complete a route tracking function of VxLAN OAM, so that a fault problem is located between two layer-3 devices. However, this solution can locate the problem only between two layer-3 devices, but cannot ensure that a layer-2 OAM packet and a service packet have a same forwarding path, and therefore, cannot precisely locate a layer-2 network problem.

SUMMARY

Embodiments of the present invention provide a service fault locating method and apparatus, so as to precisely locate a network fault problem in a multi-layer OAM architecture network.

To achieve the foregoing objective, the embodiments of the present invention provide the following technical solutions:

According to a first aspect, a service fault locating method is provided, including:

receiving a service fault locating request message, where the service fault locating request message carries a Network Protocol IP address $IP_S$ of a source layer-3 device of a service packet, an IP address $IP_D$ of a destination layer-3 device of the service packet, and a characteristic parameter of the service packet;

determining, according to the characteristic parameter of the service packet, the $IP_S$, and the $IP_D$, that a service fault is between a first layer-3 device and a second layer-3 device, where the second layer-3 device is a next hop layer-3 device of the first layer-3 device;

obtaining a first network topology between the first layer-3 device and the second layer-3 device;

determining a first forwarding path of the service packet between the first layer-3 device and the second layer-3 device according to the first network topology and the characteristic parameter of the service packet;

configuring a forwarding entry for a forwarding device in the first forwarding path, and triggering the first layer-3 device to generate an extended layer-2 OAM packet, so that the forwarding device forwards the extended layer-2 OAM packet according to the first forwarding path; and obtaining a first path parameter that is of the first forwarding path and sent by the forwarding device, and determining a specific location of the service fault according to the first path parameter.

With reference to the first aspect, in a first possible implementation manner of the first aspect, the determining a first forwarding path of the service packet between the first layer-3 device and the second layer-3 device according to the first network topology and the characteristic parameter of the service packet includes:

obtaining an egress port of the first layer-3 device according to an ingress port of the first layer-3 device and the characteristic parameter of the service packet;

obtaining a cascaded layer-2 device of the first layer-3 device according to the egress port of the first layer-3 device and the first network topology;

for each layer-2 device between the first layer-3 device and the second layer-3 device, obtaining an egress port of the layer-2 device according to an ingress port of the layer-2 device, the characteristic parameter of the service packet, and a layer-2 characteristic parameter between the first layer-3 device and the second layer-3 device, where the ingress port of the layer-2 device is a port that is in the first network topology and that connects to an egress port of a previous cascaded device of the layer-2 device;

obtaining a cascaded device of the layer-2 device according to the egress port of the layer-2 device and the first network topology; and determining the first forwarding path of the service packet between the first layer-3 device and the second layer-3 device according to the cascaded layer-2 device of the first layer-3 device and the cascaded device of each layer-2 device.

With reference to the first possible implementation manner of the first aspect, in a second possible implementation manner of the first aspect, the obtaining an egress port of the first layer-3 device according to an ingress port of the first layer-3 device and the characteristic parameter of the service packet includes:

obtaining a forwarding policy of the first layer-3 device that is opened to the outside by the first layer-3 device; and obtaining, by means of calculation, the egress port of the first layer-3 device according to the ingress port of the first layer-3 device, the characteristic parameter of the service packet, and the forwarding policy of the first layer-3 device; and the obtaining an egress port of the layer-2 device according to an ingress port of the layer-2 device, the characteristic parameter of the service packet, and a layer-2 characteristic parameter between the first layer-3 device and the second layer-3 device includes:

obtaining a forwarding policy of the layer-2 device that is opened to the outside by the layer-2 device; and obtaining, by means of calculation, the egress port of the layer-2 device according to the ingress port of the layer-2 device, the characteristic parameter of the service packet, the layer-2 characteristic parameter between the first layer-3 device and the second layer-3 device, and the forwarding policy of the layer-2 device.

With reference to the first possible implementation manner of the first aspect, in a third possible implementation manner of the first aspect, the obtaining an egress port of the first layer-3 device according to an ingress port of the first layer-3 device and the characteristic parameter of the service packet includes:

invoking an application programming interface API of the first layer-3 device, where the first layer-3 device opens a forwarding policy of the first layer-3 device to the outside in a form of the API; and querying the forwarding policy of the first layer-3 device by using the ingress port of the first layer-3 device and the characteristic parameter of the service packet as keywords, to obtain the egress port of the first layer-3 device that is sent by the first layer-3 device; and the obtaining an egress port of the layer-2 device according to an ingress port of the layer-2 device, the characteristic parameter of the service packet, and a layer-2 characteristic parameter between the first layer-3 device and the second layer-3 device includes:

invoking an API of the layer-2 device, where the layer-2 device opens a forwarding policy of the layer-2 device to the outside in a form of the API; and querying the forwarding policy of the layer-2 device by using the ingress port of the layer-2 device, the characteristic parameter of the service packet, and the layer-2 characteristic parameter between the first layer-3 device and the second layer-3 device as keywords, to obtain the egress port of the layer-2 device that is sent by the layer-2 device.

With reference to the first possible implementation manner of the first aspect, in a fourth possible implementation manner of the first aspect, the obtaining an egress port of the first layer-3 device according to an ingress port of the first layer-3 device and the characteristic parameter of the service packet includes:

determining a quantity of cascaded layer-2 devices of the first layer-3 device according to the first network topology; and if the quantity of cascaded layer-2 devices of the first layer-3 device is not 1, obtaining the egress port of the first layer-3 device according to the ingress port of the first layer-3 device and the characteristic parameter of the service packet; and the obtaining an egress port of the layer-2 device according to an ingress port of the layer-2 device, the characteristic parameter of the service packet, and a layer-2 characteristic parameter between the first layer-3 device and the second layer-3 device includes:

determining a quantity of cascaded devices of the layer-2 device according to the first network topology; and if the quantity of cascaded devices of the layer-2 device is not 1, obtaining the egress port of the layer-2 device according to the ingress port of the layer-2 device, the characteristic parameter of the service packet, and the layer-2 characteristic parameter between the first layer-3 device and the second layer-3 device.

With reference to the fourth possible implementation manner of the first aspect, in a fifth possible implementation manner of the first aspect, after the determining a quantity of cascaded layer-2 devices of the first layer-3 device according to the first network topology, the method further includes:

if the quantity of cascaded layer-2 devices of the first layer-3 device is 1, determining that the cascaded layer-2 device of the first layer-3 device is the cascaded layer-2 device of the first layer-3 device in the first network topology; and after the determining a quantity of cascaded devices of the layer-2 device according to the first network topology, the method further includes:

if the quantity of cascaded devices of the any layer-2 device is 1, determining that the cascaded device of the layer-2 device is the cascaded device of the layer-2 device in the first network topology.

With reference to any one of the first aspect to the fifth possible implementation manner of the first aspect, in a sixth possible implementation manner of the first aspect, the extended layer-2 OAM packet further includes at least one type-length-value TLV field, and the TLV field is used to identify extended layer-2 OAM packets of different services.

With reference to any one of the first aspect to the fifth possible implementation manner of the first aspect, in a seventh possible implementation manner of the first aspect, the determining, according to the characteristic parameter of the service packet, the $IP_S$, and the $IP_D$, that a service fault is between a first layer-3 device and a second layer-3 device includes:

obtaining a second network topology between the source layer-3 device and the destination layer-3 device according to the $IP_S$ and the $IP_D$;

determining a second forwarding path of the service packet between the source layer-3 device and the destination layer-3 device according to the second network topology and the characteristic parameter of the service packet; and after a layer-3 OAM packet is forwarded according to the second forwarding path, and a second path parameter of the second forwarding path is obtained, determining, according to the second path parameter, that the service fault is between the first layer-3 device and the second layer-3 device.

According to a second aspect, a service fault locating apparatus is provided, where the service fault locating apparatus includes: a receiving unit, a determining unit, an obtaining unit, a configuration unit, and a trigger unit, where the receiving unit is configured to receive a service fault locating request message, where the service fault locating request message carries a Network Protocol IP address $IP_S$ of a source layer-3 device of a service packet, an IP address $IP_D$ of a destination layer-3 device of the service packet, and a characteristic parameter of the service packet;

the determining unit is configured to determine, according to the characteristic parameter of the service packet, the $IP_S$, and the $IP_D$, that a service fault is between a first layer-3 device and a second layer-3 device, where the second layer-3 device is a next hop layer-3 device of the first layer-3 device;

the obtaining unit is configured to obtain a first network topology between the first layer-3 device and the second layer-3 device;

the determining unit is further configured to determine a first forwarding path of the service packet between the first layer-3 device and the second layer-3 device according to the first network topology and the characteristic parameter of the service packet;

the configuration unit is configured to configure a forwarding entry for a forwarding device in the first forwarding path;

the trigger unit is configured to trigger the first layer-3 device to generate an extended layer-2 OAM packet, so that the forwarding device forwards the extended layer-2 OAM packet according to the first forwarding path;

the obtaining unit is further configured to obtain a first path parameter that is of the first forwarding path and sent by the forwarding device; and the determining unit is further configured to determine a specific location of the service fault according to the first path parameter.

With reference to the second aspect, in a first possible implementation manner of the second aspect, the determining unit is specifically configured to:

obtain an egress port of the first layer-3 device according to an ingress port of the first layer-3 device and the characteristic parameter of the service packet;

obtain a cascaded layer-2 device of the first layer-3 device according to the egress port of the first layer-3 device and the first network topology;

for each layer-2 device between the first layer-3 device and the second layer-3 device, obtain an egress port of the layer-2 device according to an ingress port of the layer-2 device, the characteristic parameter of the service packet, and a layer-2 characteristic parameter between the first layer-3 device and the second layer-3 device, where the ingress port of the layer-2 device is a port that is in the first network topology and that connects to an egress port of a previous cascaded device of the layer-2 device;

obtain a cascaded device of the layer-2 device according to the egress port of the layer-2 device and the first network topology; and determine the first forwarding path of the service packet between the first layer-3 device and the second layer-3 device according to the cascaded layer-2 device of the first layer-3 device and the cascaded device of each layer-2 device.

With reference to the first possible implementation manner of the second aspect, in a second possible implementation manner of the second aspect, the determining unit is specifically configured to:

obtain a forwarding policy of the first layer-3 device that is opened to the outside by the first layer-3 device; and obtain, by means of calculation, the egress port of the first layer-3 device according to the ingress port of the first layer-3 device, the characteristic parameter of the service packet, and the forwarding policy of the first layer-3 device; and the determining unit is specifically configured to:

obtain a forwarding policy of the layer-2 device that is opened to the outside by the layer-2 device; and obtain, by means of calculation, the egress port of the layer-2 device according to the ingress port of the layer-2 device, the characteristic parameter of the service packet, the layer-2 characteristic parameter between the first layer-3 device and the second layer-3 device, and the forwarding policy of the layer-2 device.

With reference to the first possible implementation manner of the second aspect, in a third possible implementation manner of the second aspect, the determining unit is specifically configured to: invoke an application programming interface API of the first layer-3 device, where the first layer-3 device opens a forwarding policy of the first layer-3 device to the outside in a form of the API; and query the forwarding policy of the first layer-3 device by using the ingress port of the first layer-3 device and the characteristic parameter of the service packet as keywords, to obtain the egress port of the first layer-3 device that is sent by the first layer-3 device; and the determining unit is specifically configured to:

invoke an API of the layer-2 device, where the layer-2 device opens a forwarding policy of the layer-2 device to the outside in a form of the API; and query the forwarding policy of the layer-2 device by using the ingress port of the layer-2 device, the characteristic parameter of the service packet, and the layer-2 characteristic parameter between the first layer-3 device and the second layer-3 device as keywords, to obtain the egress port of the layer-2 device that is sent by the layer-2 device.

With reference to the first possible implementation manner of the second aspect, in a fourth possible implementation manner of the second aspect, the determining unit is specifically configured to:

determine a quantity of cascaded layer-2 devices of the first layer-3 device according to the first network topology; and if the quantity of cascaded layer-2 devices of the first layer-3 device is not 1, obtain the egress port of the first layer-3 device according to the ingress port of the first layer-3 device and the characteristic parameter of the service packet; and the determining unit is specifically configured to:

determine a quantity of cascaded devices of the layer-2 device according to the first network topology; and if the quantity of cascaded devices of the layer-2 device is not 1, obtain the egress port of the layer-2 device according to the ingress port of the layer-2 device, the characteristic parameter of the service packet, and the layer-2 characteristic parameter between the first layer-3 device and the second layer-3 device.

With reference to the fourth possible implementation manner of the second aspect, in a fifth possible implementation manner of the second aspect, the determining unit is further specifically configured to:

after determining the quantity of cascaded layer-2 devices of the first layer-3 device according to the first network topology, if the quantity of cascaded layer-2 devices of the first layer-3 device is 1, determine that the cascaded layer-2 device of the first layer-3 device is the cascaded layer-2 device of the first layer-3 device in the first network topology; and the determining unit is further specifically configured to:

after determining the quantity of cascaded devices of the layer-2 device according to the first network topology, if the quantity of cascaded devices of the any layer-2 device is 1, determine that the cascaded device of the layer-2 device is the cascaded device of the layer-2 device in the first network topology.

With reference to any one of the second aspect to the fifth possible implementation manner of the second aspect, in a sixth possible implementation manner of the second aspect, the extended layer-2 OAM packet further includes at least one type-length-value TLV field, and the TLV field is used to identify extended layer-2 OAM packets of different services.

With reference to any one of the second aspect to the fifth possible implementation manner of the second aspect, in a seventh possible implementation manner of the second aspect, the determining unit is specifically configured to:

obtain a second network topology between the source layer-3 device and the destination layer-3 device according to the $IP_S$ and the $IP_D$;

determine a second forwarding path of the service packet between the source layer-3 device and the destination layer-3 device according to the second network topology and the characteristic parameter of the service packet; and after a layer-3 OAM packet is forwarded according to the second forwarding path, and a second path parameter of the second forwarding path is obtained, determine, according to the second path parameter, that the service fault is between the first layer-3 device and the second layer-3 device.

Based on the service fault locating method and apparatus provided in the embodiments of the present invention, in the embodiments of the present invention, after it is determined that a service fault is between a first layer-3 device and a second layer-3 device, a first forwarding path of a service packet between the two layer-3 devices is further determined, and a forwarding entry is configured for a forwarding device in the first forwarding path, so that the forwarding device forwards an extended layer-2 OAM packet according to the first forwarding path. In this way, it is ensured that the extended layer-2 OAM packet and the service packet have a same forwarding path, and a layer-2 network fault problem can be precisely located.

BRIEF DESCRIPTION OF DRAWINGS

To describe the technical solutions in the embodiments of the present invention more clearly, the following briefly describes the accompanying drawings required for describing the embodiments.

FIG. 6 is a schematic diagram of a format of an additional TLV field in the LTM packet shown in FIG. 2;

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that, to help to clearly describe the technical solutions in the embodiments of the present invention, words such as "first" and "second" are used in the embodiments of the present invention to distinguish identical items or similar items having basically same functions or purposes. A person skilled in the art may understand that the words such as "first" and "second" do not limit a quantity and an execution order.

Embodiment 1

Figure 1:
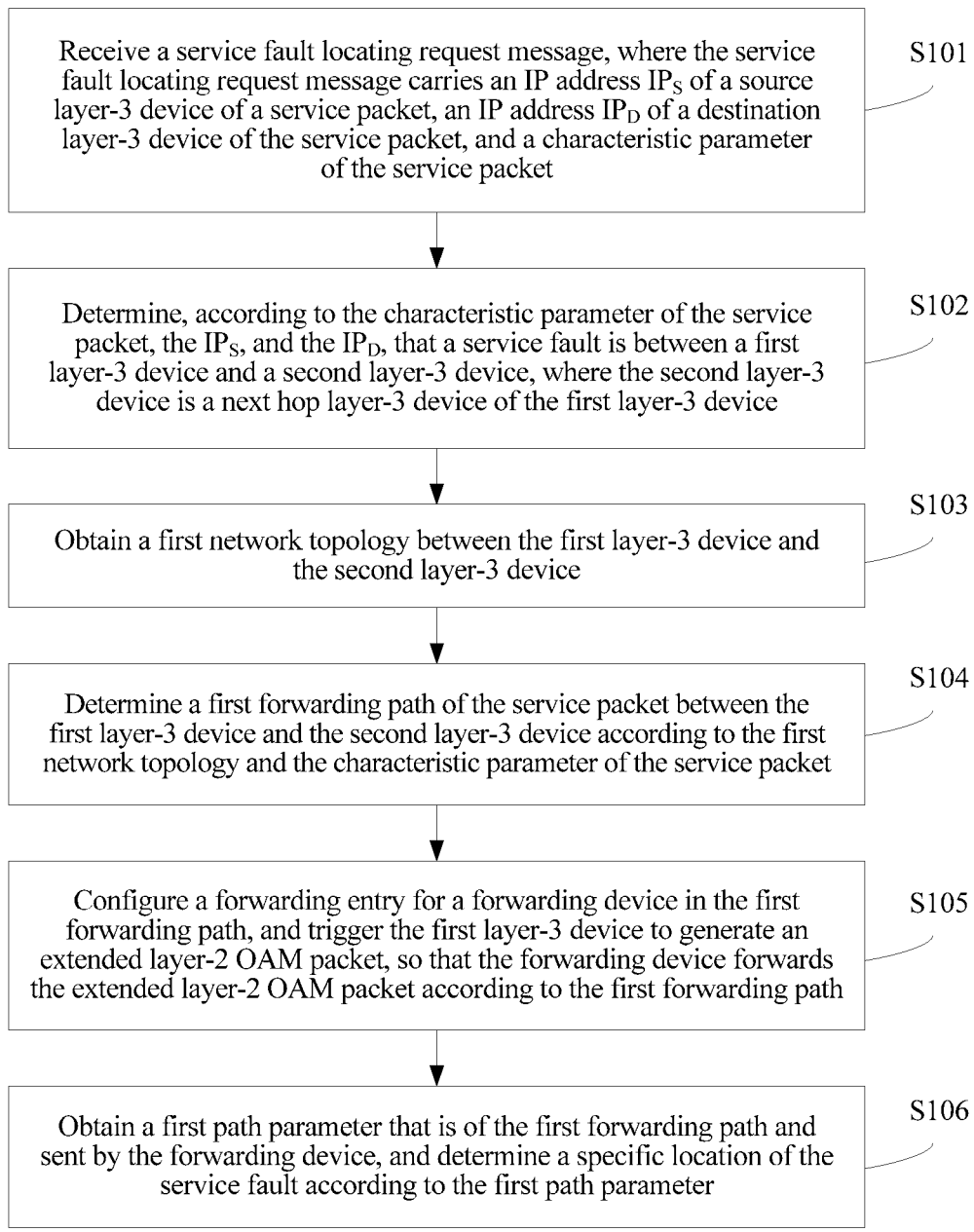
FIG. 1 is a first schematic flowchart of a service fault locating method according to an embodiment of the present invention.

This embodiment of the present invention provides a service fault locating method. As shown in FIG. 1, the method includes the following steps.

S101. Receive a service fault locating request message, where the service fault locating request message carries an IP address $IP_S$ of a source layer-3 device of a service packet, an IP address $IP_D$ of a destination layer-3 device of the service packet, and a characteristic parameter of the service packet.

Specifically, in this embodiment of the present invention, the characteristic parameter of the service packet may specifically include a service quintuple (that is, a source IP address of a service, a destination IP address of the service, a source port number of the service, a destination port number of the service, and a protocol type). Certainly, the characteristic parameter of the service packet may further include another parameter, for example, a virtual local area network (VLAN) configuration parameter. Details are not described in this embodiment of the present invention.

S102. Determine, according to the characteristic parameter of the service packet, the $IP_S$, and the $IP_D$, that a service fault is between a first layer-3 device and a second layer-3 device, where the second layer-3 device is a next hop layer-3 device of the first layer-3 device.

Specifically, an existing NVO3 VxLAN OAM solution may be used in this embodiment of the present invention. In a VxLAN OAM packet, a TTL field at an IP layer, the characteristic parameter of the service packet, the $IP_S$, and the $IP_D$ are used to complete a route tracking function of VxLAN OAM, so that the service fault is located between two layer-3 devices. Certainly, the service fault may also be located between the two layer-3 devices in another manner. For details, refer to the following embodiment, and no description is provided herein.

S103. Obtain a first network topology between the first layer-3 device and the second layer-3 device.

Specifically, in this embodiment of the present invention, a service fault locating apparatus may request the first network topology between the first layer-3 device and the second layer-3 device from a software-defined networking (SDN) controller or an element management system (EMS)/network management system (NMS) by using an IP address of the first layer-3 device and an IP address of the second layer-3 device as keywords. The first network topology may include a cascading relationship between devices, cascading port information such as a port number, a port Media Access Control (MAC) address, and a port IP address, a device type (a layer-3 device or a layer-2 device), and the like.

In this embodiment of the present invention, "cascading" is specifically connecting, and "a cascaded device" is specifically a connected next hop device. For example, a cascaded device of A specifically refers to a next hop device connected to A.

S104. Determine a first forwarding path of the service packet between the first layer-3 device and the second layer-3 device according to the first network topology and the characteristic parameter of the service packet.

The first forwarding path is specifically a transmission path of the service packet between the first layer-3 device and the second layer-3 device. For example, the first forwarding path may be: first layer-3 device→device A→device B→second layer-3 device.

S105. Configure a forwarding entry for a forwarding device in the first forwarding path, and trigger the first layer-3 device to generate an extended layer-2 OAM packet, so that the forwarding device forwards the extended layer-2 OAM packet according to the first forwarding path.

Specifically, in this embodiment of the present invention, the service fault locating apparatus may configure the forwarding entry for the forwarding device in the first forwarding path by using the SDN controller or the EMS/NMS.

In this embodiment of the present invention, the forwarding device in the first forwarding path may specifically include the first layer-3 device and each layer-2 device between the first layer-3 device and the second layer-3 device. This embodiment of the present invention sets no specific limitation thereto.

Figure 2:
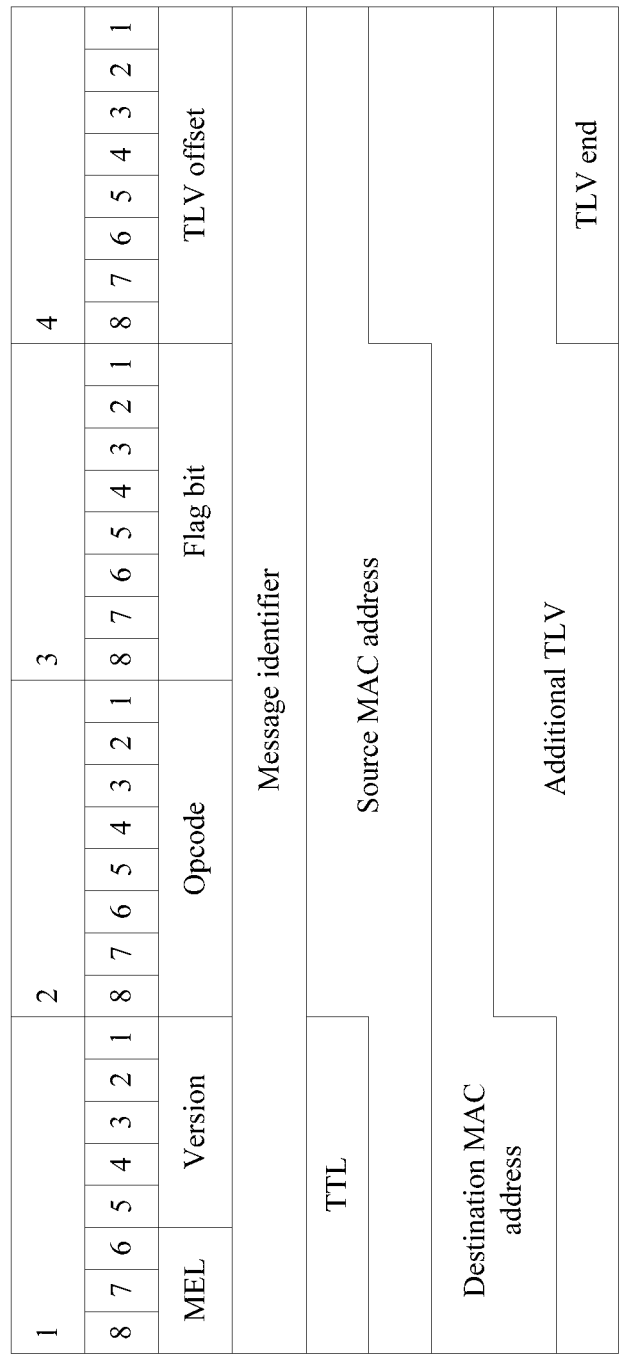
FIG. 2 is a schematic diagram of a format of an LTM packet according to an embodiment of the present invention.
Figures 3, 4A:
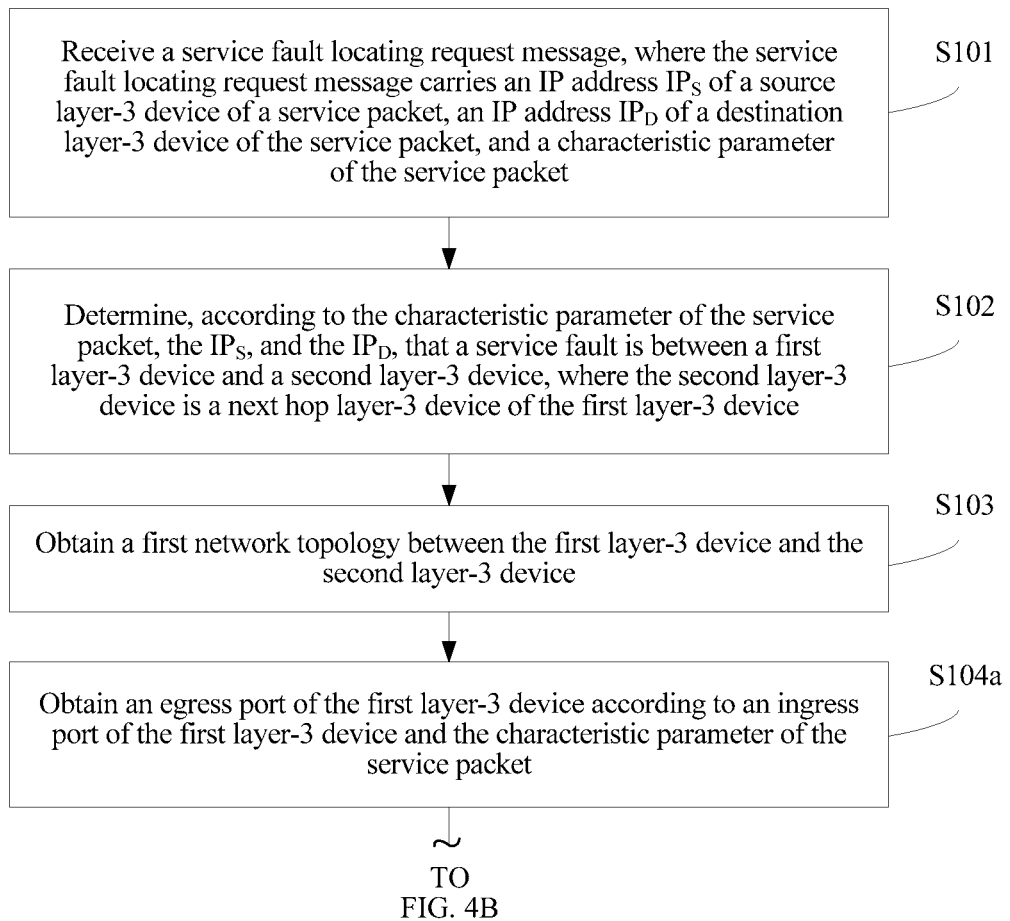
FIG. 3 is a schematic diagram of a format of a flag bit field in the LTM packet shown in FIG. 2.
FIG. 4A and FIG. 4B are a second schematic flowchart of a service fault locating method according to an embodiment of the present invention.

Preferably, the extended layer-2 OAM packet may be an extended link trace message (LTM). For example, as shown in FIG. 2, the extended layer-2 OAM packet is of an LTM format and includes a maintenance entity (ME) group (ME Group, MEG for short) level (MEG Level, MEL for short) field, a version field, an opcode field, a flag bit field, a type-length-value (TLV) offset field, a transaction identifier field, a TTL field, a source MAC address field, a destination MAC address field, an additional TLV field, and a TLV end field. The flag bit field is shown in FIG. 3, in which only a most significant bit is used. This means that the LTM packet is forwarded according to a MAC address obtained by learning from a forwarding table. By default, a value of the most significant bit is 1, and values of other seven bits are 0. In this embodiment of the present invention, one bit may be selected from the seven bits for extension. For example, the seventh bit is set to 1. This indicates that the layer-2 OAM packet is an extended layer-2 OAM packet, so that the extended layer-2 OAM packet may be distinguished from another layer-2 OAM packet unrelated to fault detection. Therefore, a forwarding path of the another layer-2 OAM packet unrelated to fault detection is prevented from being affected by configuration of a forwarding path of the extended layer-2 OAM packet.

S106. Obtain a first path parameter that is of the first forwarding path and sent by the forwarding device, and determine a specific location of the service fault according to the first path parameter.

Specifically, in this embodiment of the present invention, in a process in which the forwarding device in the first forwarding path forwards the extended layer-2 OAM packet according to the first forwarding path, the first path parameter of the first forwarding path may be detected, so that the forwarding device reports the first path parameter to the service fault locating apparatus. The service fault locating apparatus locates the specific location of the service fault according to the first path parameter.

In this embodiment of the present invention, the service fault may be specifically a link fault, may be a port fault, or may be a device fault. This embodiment of the present invention sets no specific limitation thereto.

In this embodiment of the present invention, a path parameter is specifically a parameter used to measure path quality, for example, a delay, a packet loss rate, or whether a path is connected.

Figure 4B:
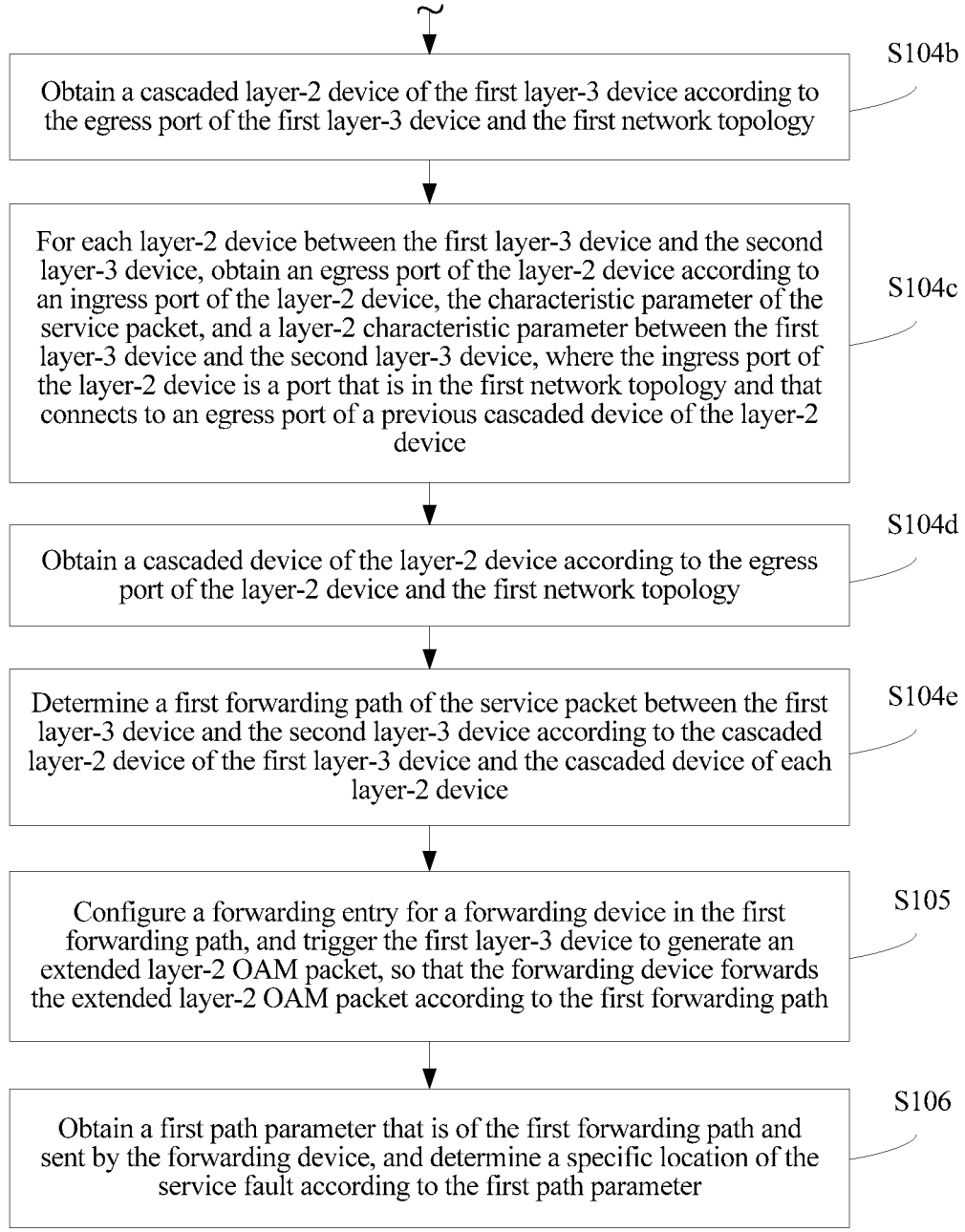

Specifically, as shown in FIG. 4A and FIG. 4B, the determining a first forwarding path of the service packet between the first layer-3 device and the second layer-3 device according to the first network topology and the characteristic parameter of the service packet (step S104) includes:

S104a. Obtain an egress port of the first layer-3 device according to an ingress port of the first layer-3 device and the characteristic parameter of the service packet.

S104b. Obtain a cascaded layer-2 device of the first layer-3 device according to the egress port of the first layer-3 device and the first network topology.

S104c. For each layer-2 device between the first layer-3 device and the second layer-3 device, obtain an egress port of the layer-2 device according to an ingress port of the layer-2 device, the characteristic parameter of the service packet, and a layer-2 characteristic parameter between the first layer-3 device and the second layer-3 device, where the ingress port of the layer-2 device is a port that is in the first network topology and that connects to an egress port of a previous cascaded device of the layer-2 device.

Specifically, in this embodiment of the present invention, the layer-2 characteristic parameter between the first layer-3 device and the second layer-3 device may specifically include a MAC address of the egress port of the first layer-3 device, a MAC address of an ingress port of the second layer-3 device, a VLAN value, and the like. This embodiment of the present invention sets no specific limitation thereto.

S104d. Obtain a cascaded device of the layer-2 device according to the egress port of the layer-2 device and the first network topology.

S104e. Determine the first forwarding path of the service packet between the first layer-3 device and the second layer-3 device according to the cascaded layer-2 device of the first layer-3 device and the cascaded device of each layer-2 device.

In a possible implementation manner, the obtaining an egress port of the first layer-3 device according to an ingress port of the first layer-3 device and the characteristic parameter of the service packet (step S104a) may specifically include:

obtaining a forwarding policy of the first layer-3 device that is opened to the outside by the first layer-3 device; and obtaining, by means of calculation, the egress port of the first layer-3 device according to the ingress port of the first layer-3 device, the characteristic parameter of the service packet, and the forwarding policy of the first layer-3 device.

For each layer-2 device between the first layer-3 device and the second layer-3 device, the obtaining an egress port of the layer-2 device according to an ingress port of the layer-2 device, the characteristic parameter of the service packet, and a layer-2 characteristic parameter between the first layer-3 device and the second layer-3 device (step S104c) may specifically include:

obtaining a forwarding policy of the layer-2 device that is opened to the outside by the layer-2 device; and obtaining, by means of calculation, the egress port of the layer-2 device according to the ingress port of the layer-2 device, the characteristic parameter of the service packet, the layer-2 characteristic parameter between the first layer-3 device and the second layer-3 device, and the forwarding policy of the layer-2 device.

In another possible implementation manner, the obtaining an egress port of the first layer-3 device according to an ingress port of the first layer-3 device and the characteristic parameter of the service packet (step S104a) may specifically include:

invoking an application programming interface (API) of the first layer-3 device, where the first layer-3 device opens a forwarding policy of the first layer-3 device to the outside in a form of the API; and querying the forwarding policy of the first layer-3 device by using the ingress port of the first layer-3 device and the characteristic parameter of the service packet as keywords, to obtain the egress port of the first layer-3 device that is sent by the first layer-3 device.

The obtaining an egress port of the layer-2 device according to an ingress port of the layer-2 device, the characteristic parameter of the service packet, and a layer-2 characteristic parameter between the first layer-3 device and the second layer-3 device (step S104c) may specifically include:

invoking an API of the layer-2 device, where the layer-2 device opens a forwarding policy of the layer-2 device to the outside in a form of the API; and querying the forwarding policy of the layer-2 device by using the ingress port of the layer-2 device, the characteristic parameter of the service packet, and the layer-2 characteristic parameter between the first layer-3 device and the second layer-3 device as keywords, to obtain the egress port of the layer-2 device that is sent by the layer-2 device.

The forwarding policy in this embodiment of the present invention may include a multi-path selection algorithm, a forwarding entry, and the like. This embodiment of the present invention sets no specific limitation thereto.

The following uses a specific example to briefly describe the service fault locating method provided in this embodiment of the present invention.

Figure 5A:
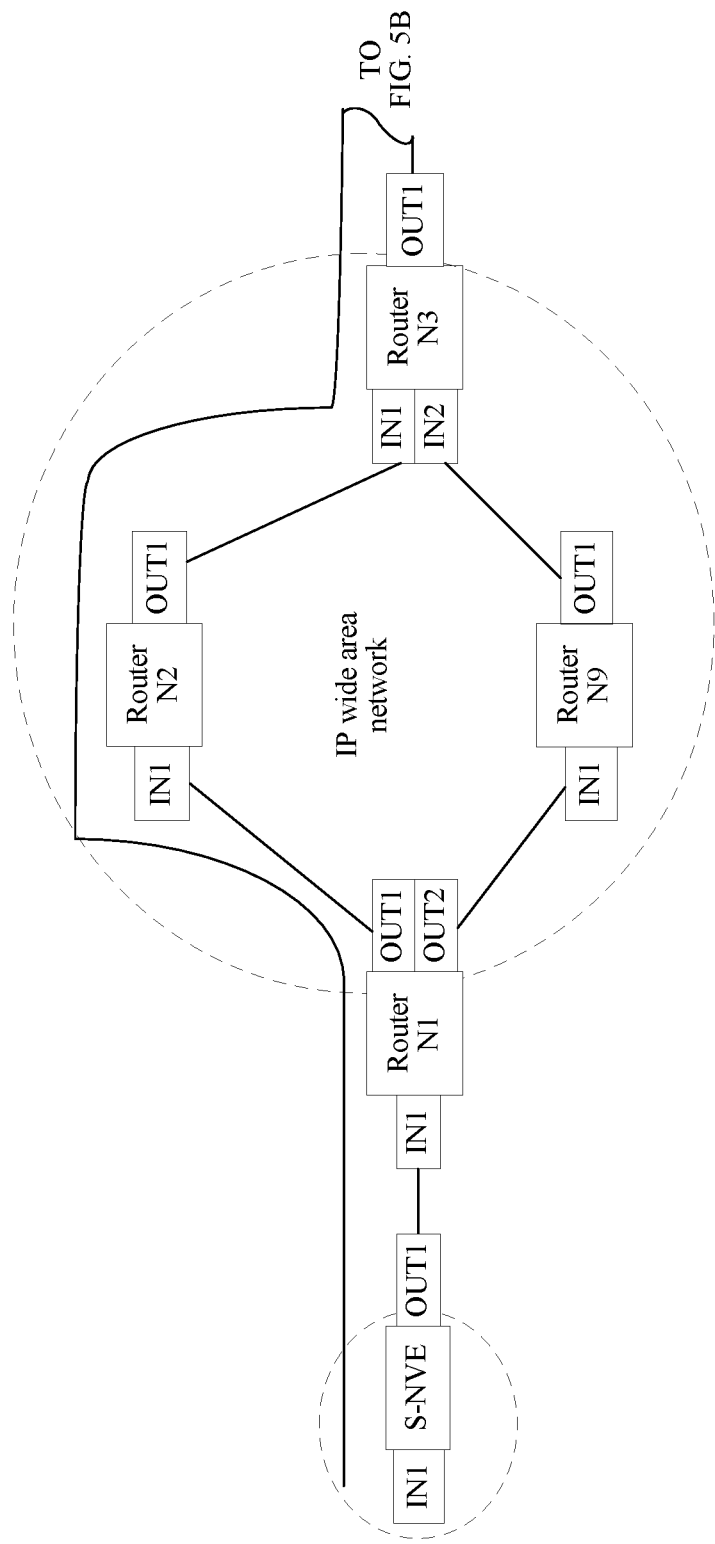
FIG. 5A and FIG. 5B are a schematic structural diagram of a VxLAN network according to an embodiment of the present invention.
Figure 5B:
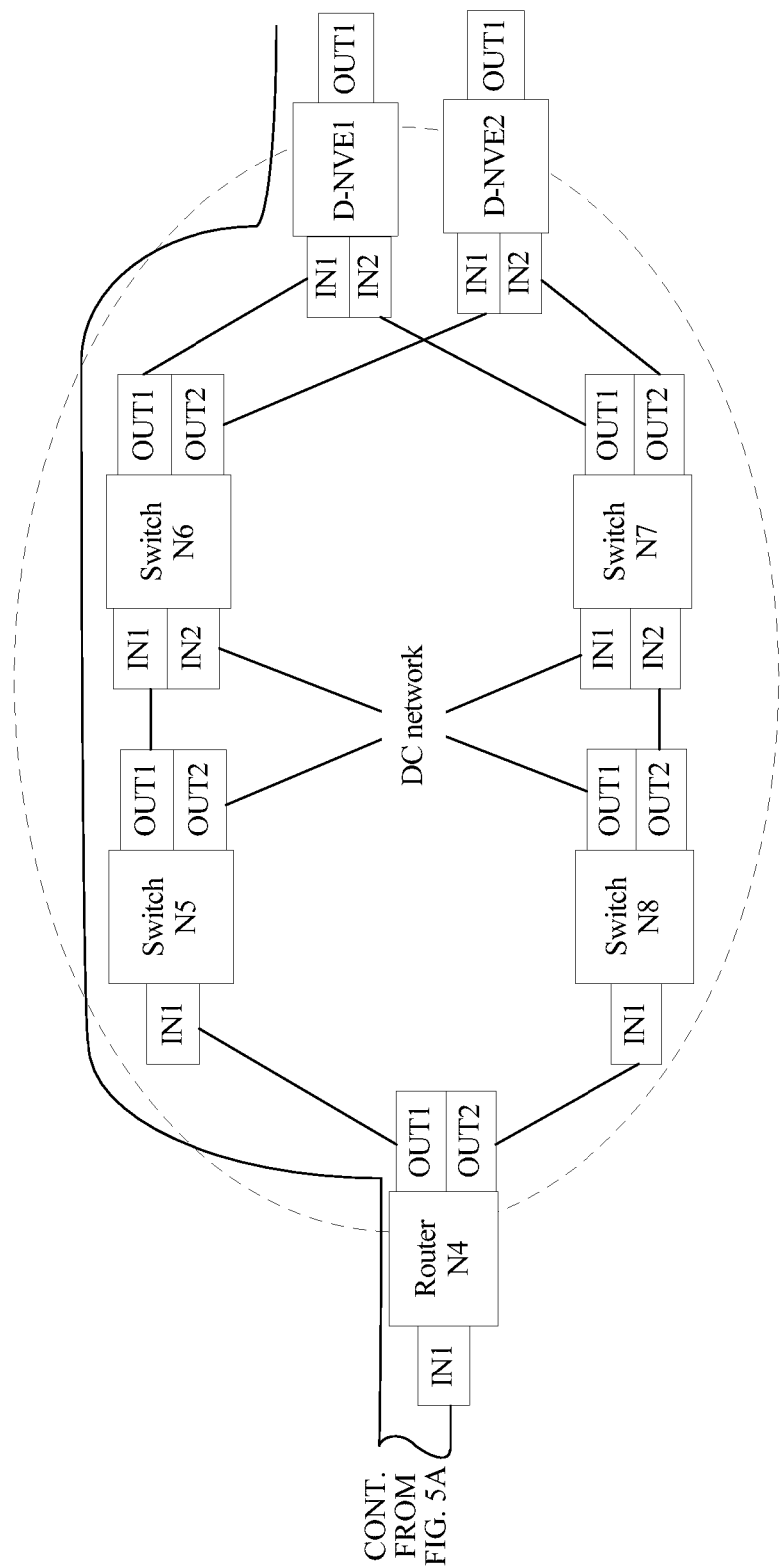

As shown in FIG. 5A and FIG. 5B, FIG. 5A and FIG. 5B are a schematic diagram of a VxLAN network. A source network virtualization endpoint (S-NVE) is a VxLAN gateway, and may be considered as a source layer-3 device. A destination network virtualization endpoint (D-NVE) is a VxLAN gateway at another end, and may be considered as a destination layer-3 device. When a user finds that quality of service deteriorates and a fault location needs to be located, a service fault locating request message that carries an IP address $IP_S$ of the S-NVE, an IP address $IP_D$ of the D-NVE, and a service quintuple (that is, a source IP address of a service, a destination IP address of the service, a source port number of the service, a destination port number of the service, and a protocol type) is sent to the service fault locating apparatus, to request to locate a service fault location. The service fault locating apparatus locates the service fault according to the following steps (it is assumed that a service forwarding path is shown by an arrow in FIG. 5A and FIG. 5B, and the service fault occurs between N5 and N6):

Step 1: Use the IP address $IP_S$ of the source layer-3 device S-NVE, an IP address $IP_D$ of a destination layer-3 device D-NVE1, and the service quintuple (that is, the source IP address of the service, the destination IP address of the service, the source port number of the service, the destination port number of the service, and the protocol type) as keywords, to locate the service fault between a first layer-3 device N4 and the second layer-3 device D-NVE1 by using the NVO3 VxLAN OAM solution.

Step 2: Use an IP address $IP_{N4}$ of the first layer-3 device N4 and the IP address $IP_D$ of the second layer-3 device D-NVE1 as keywords, to request a network topology between N4 and the D-NVE1 from the SDN controller or the EMS/NMS. The network topology includes a cascading relationship between devices, cascading port information (a port number, a port MAC address, a port IP address, and the like), and a device type (a layer-3 forwarding device or a layer-2 forwarding device). For details, refer to a network topology between N4 and the D-NVE1 in FIG. 5A and FIG. 5B.

Step 3: Determine a first forwarding path of a service packet between N4 and the D-NVE1. Specific steps are as follows:

(a). Invoke an API of N4, query a forwarding policy of N4 by using a characteristic parameter (for example, the service quintuple) of the service packet and an ingress port IN1 of N4 as keywords, to obtain an egress port OUT1 of N4, and match the egress port OUT1 with the network topology obtained in step 2, to learn that a cascaded device is N5, an ingress port is IN1, and N5 is a layer-2 device.

(b). Invoke an API of N5, use a MAC address of the egress port OUT1 of N4 as a source MAC address, use a MAC address of an ingress port IN1 of the next hop layer-3 device D-NVE1 as a destination MAC address, query a forwarding policy of N5 by using the ingress port IN1 that is obtained from N4 by means of query in (a), the characteristic parameter (for example, the service quintuple) of the service packet, the source MAC address, and the destination MAC address as keywords, to obtain an egress port OUT1 of N5, and match the egress port OUT1 with the network topology obtained in step 2, to learn that a cascaded device is N6, an ingress port is IN1, and N6 is a layer-2 device.

(c). Invoke an API of N6, query a forwarding policy of N6 by using the ingress port IN1 that is obtained from N5 by means of query in (b), the source MAC address, the destination address, and the characteristic parameter (for example, the service quintuple) of the service packet as keywords, to obtain an egress port OUT1 of N6, match the egress port OUT1 with the network topology obtained in step 2, to learn that a cascaded device is the D-NVE1, that is, the second layer-3 device, and terminate querying.

Therefore, the obtained first forwarding path of the service packet between N4 and the D-NVE1 is: (IN1) N4 (OUT1)→(IN1) N5 (OUT1)→(IN1) N6 (OUT1)→(IN1) D-NVE1.

Step 4: Configure a forwarding entry for a forwarding device in the first forwarding path according to the first forwarding path. Specific settings may be as follows:

N4: Destination MAC is a D-NVE, a service fault locating identifier is carried, and an egress port is OUT1.

N5: The service packet enters from an IN1 port, destination MAC is the D-NVE, a service fault locating identifier is carried, and an egress port is OUT1.

N6: The service packet enters from an IN1 port, destination MAC is the D-NVE, a service fault locating identifier is carried, and an egress port is OUT1.

Step 5: Trigger the first layer-3 device N4 to generate an extended layer-2 OAM packet, so that the forwarding device forwards the extended layer-2 OAM packet according to the first forwarding path.

Specifically, for a packet format of the extended layer-2 OAM packet, refer to the description in the foregoing embodiment. Details are not described herein.

Step 6: Obtain a first path parameter that is of the first forwarding path and sent by the forwarding device, and determine a specific location of the service fault according to the first path parameter.

For example, assuming that path parameters sent by N5 and N6 are excessively large or small, it represents that a location of a cross-layer service fault is between N5 and N6.

Hereto, execution of the entire service fault locating method is finished.

It should be noted that step 3 in this example is merely described by using one manner for obtaining the first forwarding path in the foregoing embodiment as an example, and certainly, the first forwarding path may also be obtained in another manner for obtaining the first forwarding path in the foregoing embodiment. Details are not described herein.

Further, in the service fault locating method provided in this embodiment of the present invention, the obtaining an egress port of the first layer-3 device according to an ingress port of the first layer-3 device and the characteristic parameter of the service packet (step S104a) may specifically include:

determining a quantity of cascaded layer-2 devices of the first layer-3 device according to the first network topology; and if the quantity of cascaded layer-2 devices of the first layer-3 device is not 1, obtaining the egress port of the first layer-3 device according to the ingress port of the first layer-3 device and the characteristic parameter of the service packet.

The obtaining an egress port of the layer-2 device according to an ingress port of the layer-2 device, the characteristic parameter of the service packet, and a layer-2 characteristic parameter between the first layer-3 device and the second layer-3 device (step S104c) may specifically include:

determining a quantity of cascaded devices of the layer-2 device according to the first network topology; and if the quantity of cascaded devices of any layer-2 device is not 1, obtaining the egress port of the layer-2 device according to the ingress port of the layer-2 device, the characteristic parameter of the service packet, and the layer-2 characteristic parameter between the first layer-3 device and the second layer-3 device.

Further, after the determining a quantity of cascaded layer-2 devices of the first layer-3 device according to the first network topology, the method further includes:

if the quantity of cascaded layer-2 devices of the first layer-3 device is 1, determining that the cascaded layer-2 device of the first layer-3 device is the cascaded layer-2 device of the first layer-3 device in the first network topology; and after the determining a quantity of cascaded devices of the layer-2 device according to the first network topology, the method further includes:

if the quantity of cascaded devices of the any layer-2 device is 1, determining that the cascaded device of the layer-2 device is the cascaded device of the layer-2 device in the first network topology.

That is, in this embodiment of the present invention, according to the first network topology, when the device has multiple egress ports, that is, the device has multiple paths, the foregoing path search manner is used. If a device has only one egress port, that is, the device does not have multiple paths, the foregoing path search manner may not be used, and a cascading sequence is directly determined according to the first network topology. In this way, a path search time can be reduced, and execution efficiency of the service fault locating method can be improved.

Optionally, in the service fault locating method provided in this embodiment of the present invention, the extended layer-2 OAM packet may further include at least one TLV field, and the TLV field is used to identify extended layer-2 OAM packets of different services.

Figure 6:
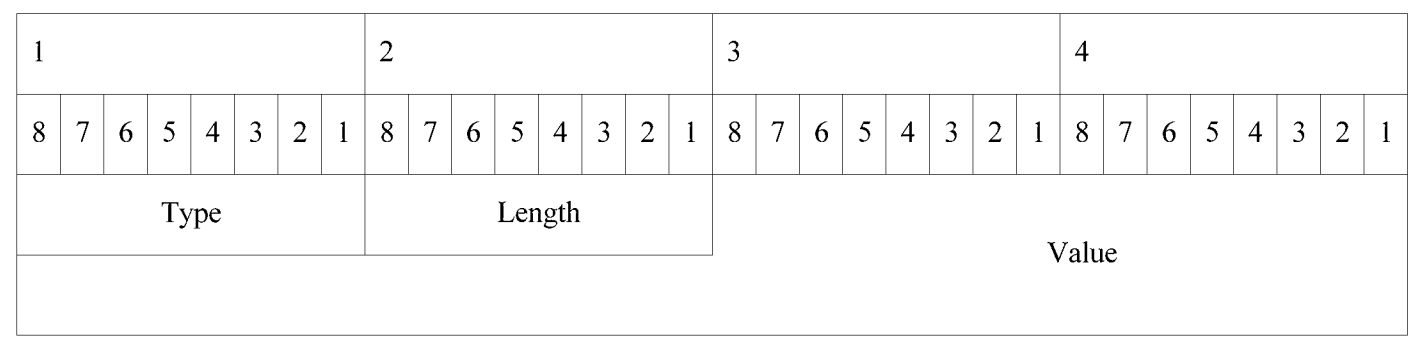

As described above, the extended layer-2 OAM packet may be specifically an extended LTM packet. In the LTM packet shown in FIG. 2, the LTM packet may include no TLV field or multiple TLV fields. However, the field is not mandatory, and is decided by the user according to a need. A TLV offset field is used to indicate a byte offset of the first TLV field relative to the TLV offset field. For example, if a TLV offset value is 0, it indicates that the first TLV field exactly follows the TLV offset field. In addition, each LTM packet necessarily carries a TLV end field, that is, there are only TLV fields between an offset location specified by the TLV offset field and a location in which the TLV end field is located. There may be multiple TLV fields, or there may be no TLV field. A format of a TLV field may be shown in FIG. 6, lengths of a type field and a length field in each TLV field are fixed, and a length of a value is specified by the length field. Therefore, when a start location of a TLV field is learned, an end location of the TLV field may be obtained by means of calculation. If there is no TLV end field at an end location, the end location is a start location of another TLV field.

Specifically, packets of multiple services may be forwarded between N4 and the D-NVE1, and forwarding paths of the packets are different. For example, some packets are forwarded along an N4-N5-N6-D-NVE1 path, and some packets are forwarded along an N4-N8-N6-D-NVE1 path. However, different extended layer-2 OAM packets may have a same destination MAC address and a same Ethernet type, and all include a first field. In this case, different services cannot be distinguished. Therefore, in this embodiment of the present invention, the extended layer-2 OAM packet may further include at least one TLV field, and the TLV field is used to identify extended layer-2 OAM packets of different services.

In this way, the extended layer-2 OAM packets of different services may be distinguished by using the TLV field, so that multiple service faults may be located at the same time.

It should be noted that the TLV field needs to be redefined according to a TLV format in this embodiment of the present invention. For example, when a type field value is specified as 200, it represents that the TLV field is a TLV field of a service identifier. A value of the service identifier may be read from a value field of the TLV field according to a length field of the TLV field.

Further, as described above, the existing NVO3 VxLAN OAM solution may be used in step S102. In a VxLAN OAM packet, a TTL field at an IP layer, the characteristic parameter of the service packet, the $IP_S$, and the $IP_D$ are used to complete a route tracking function of VxLAN OAM, so that the service fault is located between two layer-3 devices. Certainly, a cross-layer service fault problem may also be located between two layer-3 devices in another manner.

For example, the determining, according to the characteristic parameter of the service packet, the $IP_S$, and the $IP_D$, that a service fault is between a first layer-3 device and a second layer-3 device (step S102) may specifically include:

obtaining a second network topology between the source layer-3 device and the destination layer-3 device according to the $IP_S$ and the $IP_D$;

determining a second forwarding path of the service packet between the source layer-3 device and the destination layer-3 device according to the second network topology and the characteristic parameter of the service packet; and after a layer-3 OAM packet is forwarded according to the second forwarding path, and a second path parameter of the second forwarding path is obtained, determining, according to the second path parameter, that the service fault is between the first layer-3 device and the second layer-3 device.

That is, in this embodiment of the present invention, a fault at a layer above layer 2 may be located by using a layer-2 service fault locating idea that a forwarding path of a service packet is first determined, and then a forwarding path of an OAM packet is set according to the determined forwarding path. For example, when a layer-3 service fault is being located, a second forwarding path between a source layer-3 device and a destination layer-3 device may be first found according to the foregoing method, a forwarding entry of a forwarding device along the second forwarding path is then set according to the second forwarding path, and a layer-3 OAM packet is forwarded according to the second forwarding path, so as to detect a second path parameter between layer-3 devices through which a service packet passes, thereby determining, according to the second path parameter, that the service fault is between a first layer-3 device and a second layer-3 device.

This embodiment of the present invention provides the service fault locating method, including: receiving a service fault locating request message, where the service fault locating request message carries an IP address $IP_S$ of a source layer-3 device of a service packet, an IP address $IP_D$ of a destination layer-3 device of the service packet, and a characteristic parameter of the service packet; determining, according to the characteristic parameter of the service packet, the $IP_S$, and the $IP_D$, that a service fault is between a first layer-3 device and a second layer-3 device; obtaining a first network topology between the first layer-3 device and the second layer-3 device; determining a first forwarding path of the service packet between the first layer-3 device and the second layer-3 device according to the first network topology and the characteristic parameter of the service packet; configuring a forwarding entry for a forwarding device in the first forwarding path, and triggering the first layer-3 device to generate an extended layer-2 OAM packet, so that the forwarding device forwards the extended layer-2 OAM packet according to the first forwarding path; and obtaining a first path parameter that is of the first forwarding path and sent by the forwarding device, and determining a specific location of the service fault according to the first path parameter. In this embodiment of the present invention, after it is determined that the service fault is between the first layer-3 device and the second layer-3 device, the first forwarding path of the service packet between the two layer-3 devices is further determined, and the forwarding entry is configured for the forwarding device in the first forwarding path, so that the forwarding device forwards the extended layer-2 OAM packet according to the first forwarding path. Therefore, it is ensured that the extended layer-2 OAM packet and the service packet have a same forwarding path, and a layer-2 network fault problem can be precisely located.

Embodiment 2

Figure 7:
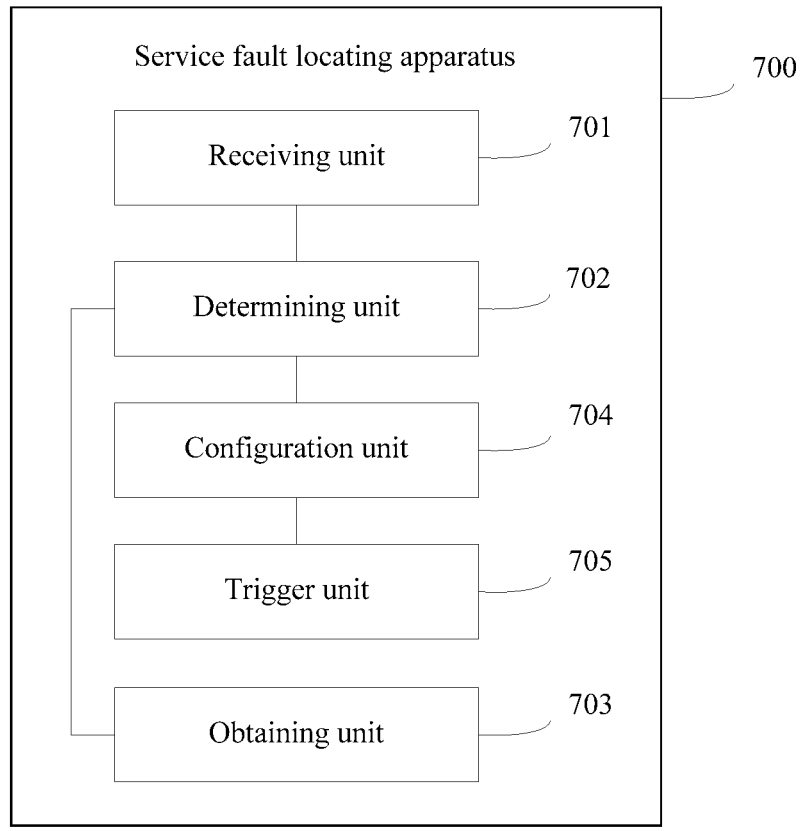
FIG. 7 is a first schematic structural diagram of a service fault locating apparatus according to an embodiment of the present invention.

This embodiment of the present invention provides a service fault locating apparatus 700. Specifically, as shown in FIG. 7, the service fault locating apparatus 700 includes: a receiving unit 701, a determining unit 702, an obtaining unit 703, a configuration unit 704, and a trigger unit 705.

The receiving unit 701 is configured to receive a service fault locating request message, where the service fault locating request message carries an IP address $IP_S$ of a source layer-3 device of a service packet, an IP address $IP_D$ of a destination layer-3 device of the service packet, and a characteristic parameter of the service packet.

The determining unit 702 is configured to determine, according to the characteristic parameter of the service packet, the $IP_S$, and the $IP_D$, that a service fault is between a first layer-3 device and a second layer-3 device, where the second layer-3 device is a next hop layer-3 device of the first layer-3 device.

The obtaining unit 703 is configured to obtain a first network topology between the first layer-3 device and the second layer-3 device.

The determining unit 702 is further configured to determine a first forwarding path of the service packet between the first layer-3 device and the second layer-3 device according to the first network topology and the characteristic parameter of the service packet.

The configuration unit 704 is configured to configure a forwarding entry for a forwarding device in the first forwarding path.

The trigger unit 705 is configured to trigger the first layer-3 device to generate an extended layer-2 OAM packet, so that the forwarding device forwards the extended layer-2 OAM packet according to the first forwarding path.

The obtaining unit 703 is further configured to obtain a first path parameter that is of the first forwarding path and sent by the forwarding device.

The determining unit 702 is further configured to determine a specific location of the service fault according to the first path parameter.

Further, the determining unit 702 is specifically configured to:

obtain an egress port of the first layer-3 device according to an ingress port of the first layer-3 device and the characteristic parameter of the service packet;

obtain a cascaded layer-2 device of the first layer-3 device according to the egress port of the first layer-3 device and the first network topology;

for each layer-2 device between the first layer-3 device and the second layer-3 device, obtain an egress port of the layer-2 device according to an ingress port of the layer-2 device, the characteristic parameter of the service packet, and a layer-2 characteristic parameter between the first layer-3 device and the second layer-3 device, where the ingress port of the layer-2 device is a port that is in the first network topology and that connects to an egress port of a previous cascaded device of the layer-2 device;

obtain a cascaded device of the layer-2 device according to the egress port of the layer-2 device and the first network topology; and determine the first forwarding path of the service packet between the first layer-3 device and the second layer-3 device according to the cascaded layer-2 device of the first layer-3 device and the cascaded device of each layer-2 device.

Further, in a possible implementation manner, the determining unit 702 is specifically configured to:

obtain a forwarding policy of the first layer-3 device that is opened to the outside by the first layer-3 device; and obtain, by means of calculation, the egress port of the first layer-3 device according to the ingress port of the first layer-3 device, the characteristic parameter of the service packet, and the forwarding policy of the first layer-3 device; and the determining unit 702 is specifically configured to:

obtain a forwarding policy of the layer-2 device that is opened to the outside by the layer-2 device; and obtain, by means of calculation, the egress port of the layer-2 device according to the ingress port of the layer-2 device, the characteristic parameter of the service packet, the layer-2 characteristic parameter between the first layer-3 device and the second layer-3 device, and the forwarding policy of the layer-2 device.

In another possible implementation manner, the determining unit 702 is specifically configured to:

invoke an API of the first layer-3 device, where the first layer-3 device opens a forwarding policy of the first layer-3 device to the outside in a form of the API; and query the forwarding policy of the first layer-3 device by using the ingress port of the first layer-3 device and the characteristic parameter of the service packet as keywords, to obtain the egress port of the first layer-3 device that is sent by the first layer-3 device; and the determining unit 702 is specifically configured to:

invoke an API of the layer-2 device, where the layer-2 device opens a forwarding policy of the layer-2 device to the outside in a form of the API; and query the forwarding policy of the layer-2 device by using the ingress port of the layer-2 device, the characteristic parameter of the service packet, and the layer-2 characteristic parameter between the first layer-3 device and the second layer-3 device as keywords, to obtain the egress port of the layer-2 device that is sent by the layer-2 device.

Further, the determining unit 702 is specifically configured to:

determine a quantity of cascaded layer-2 devices of the first layer-3 device according to the first network topology; and if the quantity of cascaded layer-2 devices of the first layer-3 device is not 1, obtain the egress port of the first layer-3 device according to the ingress port of the first layer-3 device and the characteristic parameter of the service packet; and the determining unit 702 is specifically configured to:

determine a quantity of cascaded devices of the layer-2 device according to the first network topology; and if the quantity of cascaded devices of the layer-2 device is not 1, obtain the egress port of the layer-2 device according to the ingress port of the layer-2 device, the characteristic parameter of the service packet, and the layer-2 characteristic parameter between the first layer-3 device and the second layer-3 device.

Further, the determining unit 702 is further specifically configured to:

after determining the quantity of cascaded layer-2 devices of the first layer-3 device according to the first network topology, if the quantity of cascaded layer-2 devices of the first layer-3 device is 1, determine that the cascaded layer-2 device of the first layer-3 device is the cascaded layer-2 device of the first layer-3 device in the first network topology.

The determining unit 702 is further specifically configured to:

after determining the quantity of cascaded devices of the layer-2 device according to the first network topology, if the quantity of cascaded devices of the any layer-2 device is 1, determine that the cascaded device of the layer-2 device is the cascaded device of the layer-2 device in the first network topology.

Preferably, the extended layer-2 OAM packet further includes at least one type-length-value TLV field, and the TLV field is used to identify extended layer-2 OAM packets of different services.

Further, the determining unit 702 is specifically configured to:

obtain a second network topology between the source layer-3 device and the destination layer-3 device according to the $IP_S$ and the $IP_D$;

determine a second forwarding path of the service packet between the source layer-3 device and the destination layer-3 device according to the second network topology and the characteristic parameter of the service packet; and after a layer-3 OAM packet is forwarded according to the second forwarding path, and a second path parameter of the second forwarding path is obtained, determine, according to the second path parameter, that the service fault is between the first layer-3 device and the second layer-3 device.

Specifically, for a service fault locating method performed by the service fault locating apparatus 700 provided in this embodiment of the present invention, refer to the description in Embodiment 1. Details are not described in this embodiment of the present invention.

This embodiment of the present invention provides the service fault locating apparatus, including: a receiving unit, a determining unit, an obtaining unit, a configuration unit, and a trigger unit. The receiving unit receives a service fault locating request message, where the service fault locating request message carries an IP address $IP_S$ of a source layer-3 device of a service packet, an IP address $IP_D$ of a destination layer-3 device of the service packet, and a characteristic parameter of the service packet. The determining unit determines, according to the characteristic parameter of the service packet, the $IP_S$, and the $IP_D$, that a service fault is between a first layer-3 device and a second layer-3 device. The obtaining unit obtains a first network topology between the first layer-3 device and the second layer-3 device. The determining unit determines a first forwarding path of the service packet between the first layer-3 device and the second layer-3 device according to the first network topology and the characteristic parameter of the service packet. The configuration unit configures a forwarding entry for a forwarding device in the first forwarding path. The trigger unit triggers the first layer-3 device to generate an extended layer-2 OAM packet, so that the forwarding device forwards the extended layer-2 OAM packet according to the first forwarding path. The obtaining unit obtains a first path parameter that is of the first forwarding path and sent by the forwarding device. The determining unit determines a specific location of the service fault according to the first path parameter. After determining that the service fault is between the first layer-3 device and the second layer-3 device, an OAM apparatus provided in this embodiment of the present invention further determines the first forwarding path of the service packet between the two layer-3 devices, and configures the forwarding entry for the forwarding device in the first forwarding path, so that the forwarding device forwards the extended layer-2 OAM packet according to the first forwarding path. Therefore, it is ensured that the extended layer-2 OAM packet and the service packet have a same forwarding path, and a layer-2 network fault problem can be precisely located.

Embodiment 3

Figure 8:
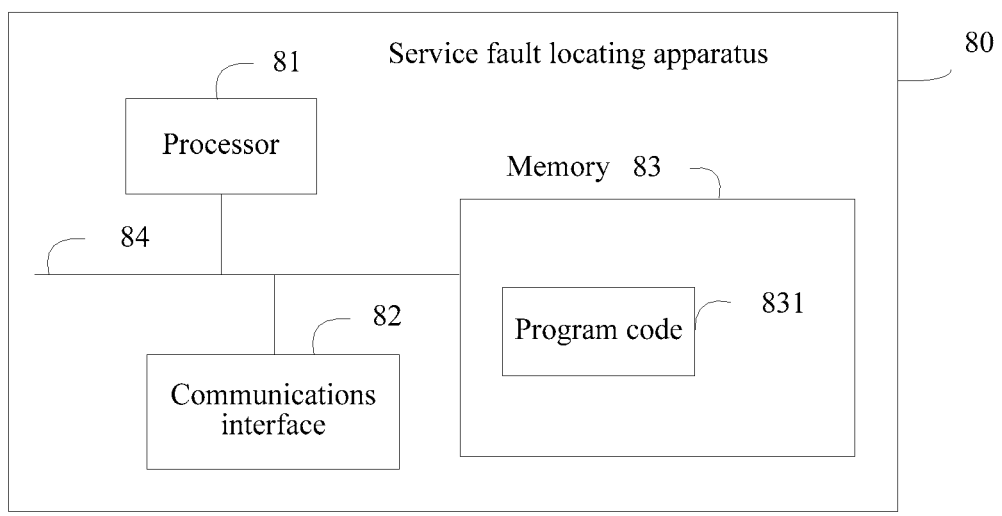
FIG. 8 is a second schematic structural diagram of a service fault locating apparatus according to an embodiment of the present invention.

This embodiment of the present invention provides a service fault locating apparatus 80. Specifically, as shown in FIG. 8, the service fault locating apparatus 80 includes: a processor 81, a communications interface 82, a memory 83, and a bus 84.

The processor 81 may be specifically a central processing unit (CPU), an application-specific integrated circuit (ASIC), or the like. This embodiment of the present invention sets no specific limitation thereto.

The memory 83 may specifically include a high-speed random access memory (random access memory, RAM for short), or may include a non-volatile memory, for example, at least one magnetic disk memory. This embodiment of the present invention sets no specific limitation thereto.

The bus 84 may be specifically an industry standard architecture (ISA) bus, a peripheral component interconnect (PCI) bus, an extended industry standard architecture (EISA) bus, or the like. The bus may be classified into an address bus, a data bus, a control bus, or the like. For ease of representation, the bus is represented in FIG. 8 by using only one line, but it does not indicate that there is only one bus or only one type of bus.

The bus 84 is configured to implement connection and communication between the processor 81, the communications interface 82, and the memory 83.

The communications interface 82 is configured to implement communication between the service fault locating apparatus 80 and the outside.

The processor 81 is configured to invoke program code 831 stored in the memory 83, to implement the method shown in FIG. 1, FIG. 4A, and FIG. 4B.

Specifically, for a service fault locating method performed by the service fault locating apparatus 80 provided in this embodiment of the present invention, refer to the description in Embodiment 1. Details are not described in this embodiment of the present invention.

After determining that a service fault is between a first layer-3 device and a second layer-3 device, an OAM apparatus provided in this embodiment of the present invention further determines a first forwarding path of a service packet between the two layer-3 devices, and configures a forwarding entry for a forwarding device in the first forwarding path, so that the forwarding device forwards an extended layer-2 OAM packet according to the first forwarding path. Therefore, it is ensured that the extended layer-2 OAM packet and the service packet have a same forwarding path, and a layer-2 network fault problem can be precisely located.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service fault locating method, comprising:
   determining that a service fault exists between a first layer-3 device and a second layer-3 device, wherein the second layer-3 device is a next hop layer-3 device of the first layer-3 device, and wherein the service fault is a link fault, a port fault, or a device fault;
   obtaining a first network topology between the first layer 3 device and the second layer 3 device;
   determining a first forwarding path of a service packet between the first layer-3 device and the second layer-3 device according to the first network topology and a characteristic parameter of the service packet;
   configuring a forwarding entry for a forwarding device in the first forwarding path, and triggering the first layer-3 device to generate an extended layer-2 operation, administration, and maintenance (OAM) packet, wherein the forwarding entry is used for forwarding the extended layer-2 OAM packet along the first forwarding path;
   obtaining a first path parameter that is of the first forwarding path and sent by the forwarding device; and
   determining a specific location of the service fault according to the first path parameter, wherein the determining the first forwarding path of the service packet between the first layer-3 device and the second layer-3 device according to the first network topology and the characteristic parameter of the service packet comprises:
  obtaining a cascaded layer-2 device of the first layer-3 device according to the characteristic parameter of the service packet and the first network topology;
  for each layer-2 device between the first layer-3 device and the second layer-3 device, obtaining a cascaded device of the layer-2 device according to the characteristic parameter of the service packet and the first network topology; and
  determining the first forwarding path of the service packet between the first layer-3 device and the second layer-3 device according to the cascaded layer-2 device of the first layer-3 device and the cascaded device of each layer-2 device.

2. The method according to claim 1, wherein before the determining that the service fault exists between the first layer-3 device and the second layer-3 device, further comprising:
  receiving a service fault locating request message, wherein the service fault locating request message comprises the characteristic parameter of the service packet.

3. The method according to claim 2, wherein the service fault locating request message further comprises an Internet Protocol (IP) address ($IP_S$) of a source layer-3 device of the service packet and an IP address ($IP_D$) of a destination layer-3 device of the service packet; and
  wherein the determining that the service fault exists between the first layer-3 device and the second layer-3 device comprises:
    determining according to the characteristic parameter of the service packet, the $IP_S$, and the $IP_D$, that the service fault exists between the first layer-3 device and the second layer-3 device.

4. The method according to claim 3, wherein the determining, according to the characteristic parameter of the service packet, the $IP_S$, and the $IP_D$, that the service fault is between a first layer-3 device and a second layer-3 device comprises:
  obtaining a second network topology between the source layer-3 device and the destination layer-3 device according to the $IP_S$ and the $IP_D$;
  determining a second forwarding path of the service packet between the source layer-3 device and the destination layer-3 device according to the second network topology and the characteristic parameter of the service packet; and
  after a layer-3 OAM packet is forwarded according to the second forwarding path, and a second path parameter of the second forwarding path is obtained, determining, according to the second path parameter, that the service fault is between the first layer-3 device and the second layer-3 device.

5. The method according to claim 1, wherein the obtaining the cascaded layer-2 device of the first layer-3 device according to the characteristic parameter of the service packet and the first network topology comprises:
  obtaining an egress port of the first layer-3 device according to an ingress port of the first layer-3 device and the characteristic parameter of the service packet; and
  obtaining the cascaded layer-2 device of the first layer-3 device according to the egress port of the first layer-3 device and the first network topology.

6. The method according to claim 5, wherein the obtaining the egress port of the first layer-3 device according to the ingress port of the first layer-3 device and the characteristic parameter of the service packet comprises:
  obtaining a forwarding policy of the first layer-3 device that is opened to the outside by the first layer-3 device; and
  obtaining, by means of calculation, the egress port of the first layer-3 device according to the ingress port of the first layer-3 device, the characteristic parameter of the service packet, and the forwarding policy of the first layer-3 device.

7. The method according to claim 5, wherein the obtaining the egress port of the first layer-3 device according to the ingress port of the first layer-3 device and the characteristic parameter of the service packet comprises:
  invoking an application programming interface (API) of the first layer-3 device, wherein the first layer-3 device opens a forwarding policy of the first layer-3 device to the outside in a form of the API; and
  querying the forwarding policy of the first layer-3 device by using the ingress port of the first layer-3 device and the characteristic parameter of the service packet as keywords, to obtain the egress port of the first layer-3 device that is sent by the first layer-3 device.

8. The method according to claim 5, wherein the obtaining the egress port of the first layer-3 device according to the ingress port of the first layer-3 device and the characteristic parameter of the service packet comprises:
  determining a quantity of cascaded layer-2 devices of the first layer-3 device according to the first network topology; and
  if the quantity of cascaded layer-2 devices of the first layer-3 device is not 1, obtaining the egress port of the first layer-3 device according to the ingress port of the first layer-3 device and the characteristic parameter of the service packet.

9. The method according to claim 8, wherein after the determining the quantity of cascaded layer-2 devices of the first layer-3 device according to the first network topology, further comprising:
  if the quantity of cascaded layer-2 devices of the first layer-3 device is 1, determining that the cascaded layer-2 device of the first layer-3 device is the cascaded layer-2 device of the first layer-3 device in the first network topology.

10. The method according to claim 1, wherein the obtaining the cascaded device of the layer-2 device according to the characteristic parameter of the service packet and the first network topology comprises:
  obtaining an egress port of the layer-2 device according to an ingress port of the layer-2 device, the characteristic parameter of the service packet, and a layer-2 characteristic parameter between the first layer-3 device and the second layer-3 device, wherein the ingress port of the layer-2 device is a port that is in the first network topology and that connects to an egress port of a previous cascaded device of the layer-2 device; and
  obtaining the cascaded device of the layer-2 device according to the egress port of the layer-2 device and the first network topology.

11. The method according to claim 10, wherein the obtaining the egress port of the layer-2 device according to the ingress port of the layer-2 device, the characteristic parameter of the service packet, and the layer-2 characteristic parameter between the first layer-3 device and the second layer-3 device comprises:

obtaining a forwarding policy of the layer-2 device that is opened to the outside by the layer-2 device; and
obtaining, by means of calculation, the egress port of the layer-2 device according to the ingress port of the layer-2 device, the characteristic parameter of the service packet, the layer-2 characteristic parameter between the first layer-3 device and the second layer-3 device, and the forwarding policy of the layer-2 device.

12. The method according to claim 10, wherein the obtaining the egress port of the layer-2 device according to the ingress port of the layer-2 device, the characteristic parameter of the service packet, and the layer-2 characteristic parameter between the first layer-3 device and the second layer-3 device comprises:
  invoking an API of the layer-2 device, wherein the layer-2 device opens a forwarding policy of the layer-2 device to the outside in a form of the API of the layer-2 device; and
  querying the forwarding policy of the layer-2 device by using the ingress port of the layer-2 device, the characteristic parameter of the service packet, and the layer-2 characteristic parameter between the first layer-3 device and the second layer-3 device as keywords, to obtain the egress port of the layer-2 device that is sent by the layer-2 device.

13. The method according to claim 10, wherein the obtaining the egress port of the layer-2 device according to the ingress port of the layer-2 device, the characteristic parameter of the service packet, and the layer-2 characteristic parameter between the first layer-3 device and the second layer-3 device comprises:
  determining a quantity of cascaded devices of the layer-2 device according to the first network topology; and
  if the quantity of cascaded devices of the layer-2 device is not 1, obtaining the egress port of the layer-2 device according to the ingress port of the layer-2 device, the characteristic parameter of the service packet, and the layer-2 characteristic parameter between the first layer-3 device and the second layer-3 device.

14. The method according to claim 13, wherein after the determining the quantity of cascaded devices of the layer-2 device according to the first network topology, further comprising:
  if the quantity of cascaded devices of the layer-2 device is 1, determining that the cascaded device of the layer-2 device is the cascaded device of the layer-2 device in the first network topology.

15. The method according to claim 1, wherein the extended layer-2 OAM packet further comprises at least one type-length-value (TLV) field, and the TLV field is used to identify extended layer-2 OAM packets of different services.

16. The method according to claim 1, wherein the first path parameter is used to measure path quality.

17. A service fault locating apparatus comprising:
  a processor; and
  a non-transitory computer readable medium which contains computer-executable instructions;
  wherein the processor is configured to execute the computer-executable instructions to perform operations comprising:
  determining that a service fault exists between a first layer-3 device and a second layer-3 device, wherein the second layer-3 device is a next hop layer-3 device of the first layer-3 device, and wherein the service fault is a link fault, a port fault, or a device fault;
  obtaining a first network topology between the first layer 3 device and the second layer 3 device;
  determining a first forwarding path of a service packet between the first layer-3 device and the second layer-3 device according to the first network topology and a characteristic parameter of the service packet;
  configuring a forwarding entry for a forwarding device in the first forwarding path, and triggering the first layer-3 device to generate an extended layer-2 operation, administration, and maintenance (OAM) packet, wherein the forwarding entry is used for forwarding the extended layer-2 OAM packet along the first forwarding path;
  obtaining a first path parameter that is of the first forwarding path and sent by the forwarding device; and
  determining a specific location of the service fault according to the first path parameter,
  wherein the determining the first forwarding path of the service packet between the first layer-3 device and the second layer-3 device according to the first network topology and the characteristic parameter of the service packet comprises:
  obtaining a cascaded layer-2 device of the first layer-3 device according to the characteristic parameter of the service packet and the first network topology;
  for each layer-2 device between the first layer-3 device and the second layer-3 device, obtaining a cascaded device of the layer-2 device according to the characteristic parameter of the service packet and the first network topology; and
  determining the first forwarding path of the service packet between the first layer-3 device and the second layer-3 device according to the cascaded layer-2 device of the first layer-3 device and the cascaded device of each layer-2 device.

18. A non-transitory computer readable medium which contains computer-executable instructions, wherein the computer-executable instructions, when executed by a computer, enables the computer to perform operations comprising:
  determining that a service fault exists between a first layer-3 device and a second layer-3 device, wherein the second layer-3 device is a next hop layer-3 device of the first layer-3 device, and wherein the service fault is a link fault, a port fault, or a device fault;
  obtaining a first network topology between the first layer 3 device and the second layer 3 device;
  determining a first forwarding path of a service packet between the first layer-3 device and the second layer-3 device according to the first network topology and a characteristic parameter of the service packet;
  configuring a forwarding entry for a forwarding device in the first forwarding path, and triggering the first layer-3 device to generate an extended layer-2 operation, administration, and maintenance (OAM) packet, wherein the forwarding entry is used for forwarding the extended layer-2 OAM packet along the first forwarding path;
  obtaining a first path parameter that is of the first forwarding path and sent by the forwarding device; and
  determining a specific location of the service fault according to the first path parameter,
  wherein the determining the first forwarding path of the service packet between the first layer-3 device and the second layer-3 device according to the first network topology and the characteristic parameter of the service packet comprises:

obtaining a cascaded layer-2 device of the first layer-3 device according to the characteristic parameter of the service packet and the first network topology;

for each layer-2 device between the first layer-3 device and the second layer-3 device, obtaining a cascaded device of the layer-2 device according to the characteristic parameter of the service packet and the first network topology; and determining the first forwarding path of the service packet between the first layer-3 device and the second layer-3 device according to the cascaded layer-2 device of the first layer-3 device and the cascaded device of each layer-2 device.

* * * * *